US008004399B2

(12) United States Patent
Reyes et al.

(10) Patent No.: US 8,004,399 B2
(45) Date of Patent: Aug. 23, 2011

(54) LIFE SAFETY DEVICE WITH INTEGRATED WI-FI AND GPS CAPABILITY

(75) Inventors: Javier E. Reyes, West Babylon, NY (US); Howard Yuk, East Meadow, NY (US); Albert Lee, Brooklyn, NY (US)

(73) Assignee: Honeywell International Inc., Morristown, NJ (US)

(*) Notice: Subject to any disclaimer, the term of this patent is extended or adjusted under 35 U.S.C. 154(b) by 382 days.

(21) Appl. No.: 11/870,980

(22) Filed: Oct. 11, 2007

(65) Prior Publication Data

US 2009/0096602 A1 Apr. 16, 2009

(51) Int. Cl.

| | |
|---|---|
| ***G08B 1/08*** | (2006.01) |
| *G08B 29/00* | (2006.01) |
| *G08B 23/00* | (2006.01) |
| *H04M 11/04* | (2006.01) |

(52) U.S. Cl. ................... 340/539.13; 340/506; 340/321; 455/404.2

(58) Field of Classification Search ............. 340/539.13, 340/506, 321; 455/404.2

See application file for complete search history.

(56) References Cited

U.S. PATENT DOCUMENTS 5,652,570 A * 7/1997 Lepkofker ................. 340/573.4
5,923,255 A * 7/1999 Vahdatshoar .............. 340/573.4
5,940,004 A * 8/1999 Fulton ............................ 340/8.1
6,044,257 A * 3/2000 Boling et al. .............. 455/404.2
6,310,539 B1 10/2001 Rye et al.
7,038,590 B2 5/2006 Hoffman et al.
7,106,193 B2 9/2006 Kovach
2002/0072348 A1 * 6/2002 Wheeler et al. ............... 455/404
2005/0190057 A1 9/2005 Monroe
2006/0276166 A1 12/2006 Jenkins
2007/0008153 A1 1/2007 Albert
2007/0164872 A1 7/2007 Monroe
2007/0200716 A1 * 8/2007 Haase et al. .................. 340/574
2007/0293186 A1 * 12/2007 Lehmann .................. 455/404.2

* cited by examiner

*Primary Examiner* — George Bugg

*Assistant Examiner* — Jack Wang

(74) *Attorney, Agent, or Firm* — Husch Blackwell

(57) ABSTRACT

This invention relates to a central security and alarm system that provides an ability to respond to an emergency signal sent from a personal life safety device to a system central monitoring location using Wi-Fi, where the emergency signal include GPS coordinates of a location of the personal life safety device so that emergency responders can be sent to investigate and/or respond to the emergency. The system includes at least a personal life safety device including GPS and Wi-Fi capability, and an ability to respond to a user input to generate and transmit an emergency signal and a central monitoring station constructed to receive and respond to the emergency signal by identifying the user GPS coordinates, and initiate a response by emergency responders.

10 Claims, 2 Drawing Sheets

LIFE SAFETY DEVICE WITH INTEGRATED WI-FI AND GPS CAPABILITY

BACKGROUND OF THE INVENTION

Figure 1:
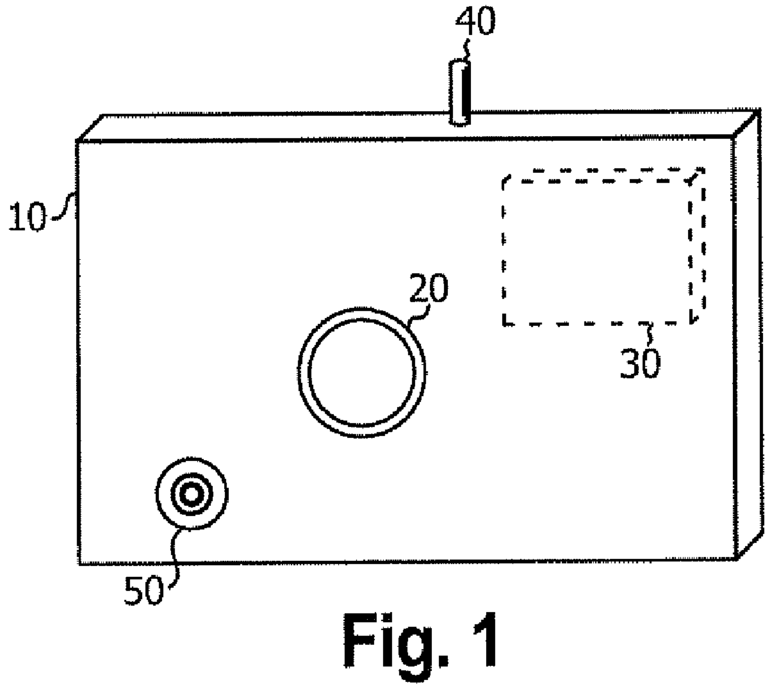

The present invention relates to security systems, and more particularly relates to a centralized security and alarm system, and related method, which operate to control a life safety device with integrated Wi-Fi and GPS capability.

Home security and personal safety are major concerns for individuals, and their loved ones. Most homeowners wish to protect their valuables and maintain safe havens for themselves and their family members. To that end, numerous conventional central security and alarm systems for homes and businesses are known to provide various monitoring, surveillance and notification features and options to protect the homes, homeowners, family members, visitors, businesses, workers, customers, etc, which automatically notify an end-user at the protected premises at detection of an alarm event, and allow the end-user to automatically generate a communicate signal in an attempt to notify monitoring personnel, or systems of an emergent event.

Conventional central security and alarm systems operate generally as follows. An alarm event detection device protecting an alarm zone, e.g., a front door, of protected premises will detect an alarm event such as an unauthorized opening of the front door. The detection is communicated by the detection device to a local central home panel, or server. The central panel, in response to receipt of detection notification, and typically after some fixed alarm-entry delay (where the alarm is not cancelled), transmits an alarm notification (signal) to a central monitoring station, where slated persons can respond to the notification. Alarm event detection devices include but are not limited to window detectors, door detectors, motion sensors, digital and analog (CCTV) image or acquisition devices and cameras, passive infrared (PIR) detectors, microwave detectors, seismic detectors, dual-modality sensor, ultrasonic and other human motion detectors and systems.

In addition to such traditional features of convention central security and alarm systems, many conventional alarm systems also include a feature where in an emergency the end user can automatically communicate an emergency condition. The feature is known to be implemented via hand-held devices that may be carried or attached to the end user. For example, a hand-held electronic device that includes a "panic button," such as a life safety pendant or device. Such known life safety devices may be operated in an emergency by simply activating the panic button. For example, the panic button would be activated by a user upon becoming aware of a presence of an intruder, upon detecting a fire, upon detecting an emergency medical condition requiring an emergent response or other emergency situation an immediate communication with a central monitoring station (central station) or service is prudent. Such "panic button" initiated communication signals, or other communications further require that the sender verbally, or by text message, communicate the type of emergency upon contact with responders to provide some indication of the nature of the emergency.

Such conventional operation of known life safety devices with panic button-type activation features may include that the signal from the life safety device is communicated to a local or central panel, which in turn communicates to the central station, or in some cases communicate directly to a centralized security monitoring local (central station) or local police, fire or emergency healthcare providers. The emergency (panic button) signal produced and communicated by known life safety devices is typically distinguishable from an emergency signal communicated by a fire or intrusion detection device so that it is readily distinguished from such fire or intrusion detection device signals so that responders can appreciate the nature of the urgency of the emergency communication via the signal.

A drawback of known life safety devices, and corresponding central security and alarm system operation is that when activated to respond to an emergency, they do not provide the physical location of the user who has activated the device. For that matter, conventional life safety devices, and corresponding system operation typically requires a conscious and alert user to inform a central station of their location. Life safety devices are known to attempt to accommodate this requirement, for example, by including for use a remote speaker and microphone device to enable voice communication with monitoring personnel. That is, there is a need to allow a user to communicate with a central monitoring station, or other remote location at which responders are resident regarding any life safety condition.

The reader should readily agree that such operation poses an acute problem under circumstances where the user in need of an emergency response or physical intervention has been incapacitated, either before, or immediately after sending a panic signal. Incapacitation will prevent the user in the emergency situation from communicating to responders their exact location. As an example, emergency medical personnel (e.g., police or EMTs) that might be dispatched in response to a signal communicated by a user via a known life safety device would be required to search the premises or location for the incapacitated user upon arrival at the protected premises, wasting valuable time. It is known that under conditions of cardiac arrest, where the victim is unconscious, the chance of survival decreases by ten (10) percent Accordingly, a more efficient and effective life safety device, method for effectively communicating by the novel life safety device to security personnel, and central security and alarm system that is readily able to respond to same life safety device to identify the exact location of the user actuating the life safety device that overcomes the shortcomings of the conventional arts.

SUMMARY OF THE INVENTION

To that end, the present invention solves the above-described problems with prior art life safety devices, and their operation, by providing a personal life safety device, and a central security and alarm system and method that operate with the personal life safety device. Preferably, the personal life safety device is hand-carried, attached to or otherwise physically accessible by the end-user in cases of emergency. The personal life safety device is constructed to communicate to a local security and alarm system central panel, or central monitoring location (central station) utilizing Wi-Fi, or wireless LAN/WAN communication protocol, e.g., IEEE 802.11x, allowing the user in need to summon immediate help with the device. With integrated Wi-Fi capability, the personal safety device, and associated security and alarm system operation in response to emergency signals transmitted therefrom provides a link or communication channel using "voice over Internet Protocol" (VoIP). VoIP capability allows the novel personal life safety device to carry out two-way voice communication, and/or communicate using text-based messaging, as email or text messaging.

By taking advantage of the advancing miniaturization of technology this is continually rendering electronic components smaller and more cost effective, the personal life safety device is constructed with integrated circuits to support the Wi-Fi communications. Through a Wi-Fi gateway, communicated data is routed for the personal life safety device after a communication channel is established. In one embodiment, when a button or actuator on the personal life safety device is pressed, the device automatically dials a pre-set phone number that accesses security and alarm system monitoring personnel, or other emergency responders using the VoIP communications protocol. Preferably, each personal life safety device is constructed with an integrated speaker within the device to allow two-way voice communications. The two-way voice communication ability is in addition to the ability for the novel personal life safety device to send email or SMS text messages to a pre-programmed destination address for receiving the communications in an emergency.

For that matter, the personal life safety device and related system operation includes integrated GPS capability that can automatically communicate to the security system central panel, or central station, the coordinates of the physical location of the end-user (the location of the personal life safety device). Over the last few years, improvements to developing GPS and Wi-Fi technology has facilitated that the two technologies are a part of how we communicate, and how we navigate through our world. The personal life safety device of this invention is the result of leveraging the two formerly disparate technologies into a single personal life safety device that may be constructed in a form of a pendant, bracelet, or attachment piece to the body, e.g., apparel, through a Wi-Fi gateway enables a two-way exchange of data by the device.

Preferably the personal life safety device will operate as follows. When a button or sensor is activated by a user to trigger the personal life safety device to communicate an emergency condition, an electronic message in a form of an email or SMS text message is automatically sent. The message contains the GPS coordinates of the end-user in need of help, for example, that the user requires immediate medical intervention. The message and GPS coordinates that are communicated via the personal life safety device via the VoIP technology, when received at a central station (or other response center) allow for immediate dispatch of interveners, for example, first responders such as EMTs, to the exact location of the place of transmission. By its inherent capabilities, the novel personal life safety device is not limited to operating only at the premises protected by the device. More particularly, because of the device's inherent GPS capability, and inclusion of GPS coordinates of the user's location at the sending of the emergency signal via VoIP, the user's location can be tracked just about anywhere, at least in US locations. Most US cities and/or towns are incorporating public Wi-Fi access points, or have plans for same, such that the device can or will shortly be able to be used just about anywhere in the US.

BRIEF DESCRIPTION OF THE DRAWING FIGURES

Figure 2:
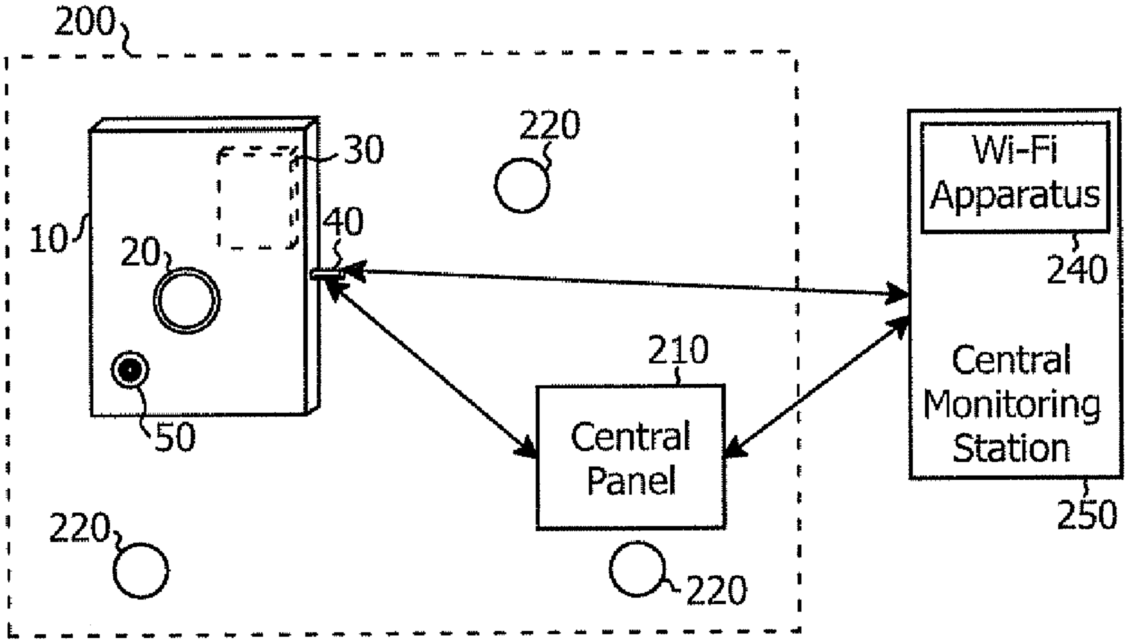
Figure 3A:
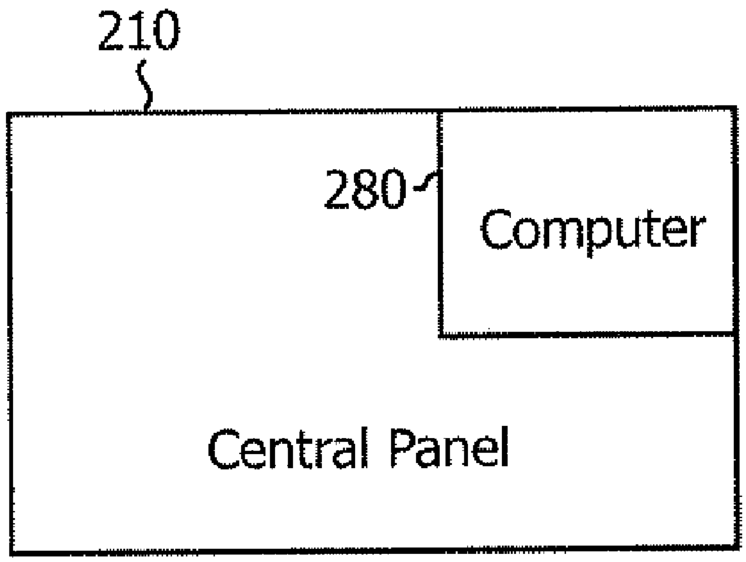
Figure 3B:
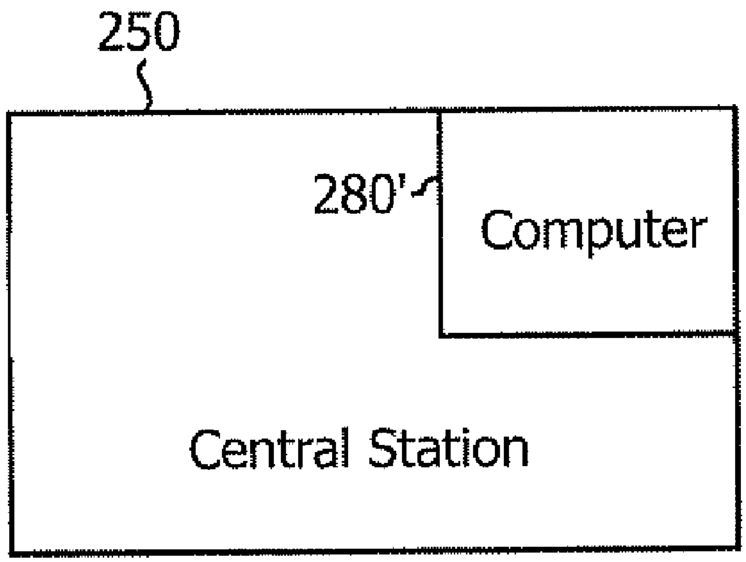

FIG. 1 is a schematic diagram of one embodiment of a personal life safety device that operates in accordance with the invention;

FIG. 2 is a schematic diagram of one embodiment of a central security monitoring and alarm system for operating with the novel personal life safety device; and FIGS. 3*a* and 3*b* depict a computer that may be programmed to carry out the novel inventive operation when located at the protected premises, i.e., comprising a central panel, or a central monitoring location, i.e., comprising a control panel at the central station.

DETAILED DESCRIPTION OF THE PREFERRED EMBODIMENTS

As indicated hereinabove, it should be understood that the present invention could be realized in hardware, software, or a combination of hardware and software. Any kind of computer/server system(s)—or other apparatus adapted for carrying out the novel alarm verification methods described herein—is suited. A typical combination of hardware and software could be a general-purpose computer system with a computer program that, when loaded and executed, carries out the respective methods described herein. Alternatively, a specific use computer, containing specialized hardware for carrying out one or more of the functional tasks of the invention, could be utilized.

The present invention can also be embodied in a computer program product, which comprises all the respective features enabling the implementation of the methods described herein, for example, the exemplary methods depicted in figures herein, and which product—when loaded in a computer system—is able to carry out these and related methods. Computer program, software program, program, or software, in the present context mean any expression, in any language, code or notation, of a set of instructions intended to cause a system having an information processing capability to perform a particular function either directly or after either or both of the following: (a) conversion to another language, code or notation; and/or (b) reproduction in a different material form.

A first embodiment of a personal life safety device (10) of the invention is depicted in FIG. 1. The personal life safety device (10) is shown to include a panic button (20), that when pressed or otherwise activated by an end-user, communicates an emergent condition by sending a signal via VoIP technology that includes the GPS coordinates of the user automatically at the instant the signal is sent. A controller (30) comprises a controller, or some other computer-based component for controlling device communication with the VoIP feature, and for identifying and incorporating instant GPS coordinates of the devices location into the communication signal. The controller generates the appropriate signal content and sends the signal for transmission to an antenna (40). Antenna (40) transmits the signal and GPS coordinates using the Wi-Fi standard. Preferably, a speaker/microphone (50) allows the user to communicate verbally using the personal life safety device and its VoIP feature.

A first embodiment of a personal life safety device (10) of the invention is depicted in FIG. 1. The personal life safety device (10) is shown to include a panic button (20), that when pressed or otherwise activated by an end-user, communicates an emergent condition by sending a signal via VoIP technology that includes the GPS coordinates of the user automatically at the instant the signal is sent. A controller (30) comprises a controller, or some other computer-based component for controlling device communication with the VoIP feature, and for identifying and incorporating instant GPS coordinates of the device's location into the communication signal. The controller generates the appropriate signal content and sends the signal for transmission to an antenna (40). Antenna (40) transmits the signal and GPS coordinates using the Wi-Fi standard. Preferably, a speaker/microphone (50) allows the user to communicate verbally using the personal life safety device and its VoIP feature.

A first embodiment of a central security and alarm system ("central security system") (200) that includes the novel personal safety device or pendant (10) is shown in FIG. 2. Central security system (200) includes a central panel (210) that is in communication with a number of alarm event detection devices (220), which may be hardwired to the central panel (210), or "attached" wirelessly. The personal life safety device (10) is arranged to communicate directly to the central panel (210) using the Wi-Fi operational VoIP technology, including automatically incorporating into any emergency signal the GPS location of the device. For that matter, while shown proximate the central panel (210) in FIG. 2, the device may communicate with the central panel using the Wi-Fi-based VoIP feature, and GPS coordinates, for any location having Wi-Fi access. The system, and the personal life safety device are constructed to enable the personal life safety device to communicate directly with Wi-Fi apparatus (240) located and, present at a central monitoring station (250) using the Wi-Fi-based VoIP technology.

The central panel 210 is typically in communication with a central monitoring station 250, where communications to/from the central panel, or directly from the end-user via the pendant or personal safety device are transmitted. When the central panel 210 receives notice of a detected alarm, it initiates a Wi-Fi channel with the device (10) or central station (250).

And while it is apparent that the invention herein disclosed is well calculated to fulfill the objects stated above, it will be appreciated that numerous modifications and embodiments may be devised by those skilled in the art and it is intended that the appended claims cover all such modifications and embodiments as fall within the true spirit and scope of the present invention.

What is claimed is:

1. A method for monitoring for emergency notification by use of a personal life safety device at a central monitoring station where the personal life safety device is constructed to provide coordinates of the device's location upon actuation of an emergency notification feature by a device user in an emergency, comprising the steps of:
- the user activating the emergency notification feature to summon emergency responders to the device's location at said coordinates;
- the personal life safety device responding to the user activating by automatically generating and sending a signal comprising said coordinates to a local panel at the instant the signal is sent;
- the local panel relaying the signal to the central monitoring station;
- the central monitoring station responding to the signal by summoning the emergency responders; and
- at least one of the central monitoring station and the local panel automatically initiating a direct two-way VoIP communication channel with the personal life safety device providing direct communication between personnel at the central monitoring station or local panel and a user of the personal safety device thereby allowing the personnel to determine details relating to the emergency upon activation of the emergency notification feature.

2. The method as set forth in claim 1, wherein the step of activating includes that said coordinates are GPS coordinates.

3. The method as set forth in claim 1, wherein the step of receiving and responding includes that the central monitoring station immediately determines the exact location of the personal life safety device and communicates same to the emergency responders.

4. The method as set forth in claim 1, wherein upon establishing the communication channel, the central monitoring Station continuously receives updates of said coordinates, and continually provides said updates to said emergency responders in a case where it is deterimined from said coordinates that the personal safety device has changed, or is changing location.

5. The method as set forth in claim 1, wherein in response to receipt of the relayed signal, the central monitoring station opens a communication channel with the local panel, and the local panel attempts to extend the open channel to the personal life safety device.

6. The method as set forth in claim 1, wherein VoIP channel is enabled using Wi-Fi technology.

7. A central security and alarm system that includes responding to an emergency signal sent from a personal life safety device to a system central monitoring location via a local monitoring station using Wi-Fi, where the emergency signal includes GPS coordinates of a location of the personal life safety device, the system comprising:
- a personal life safety device including GPS and Wi-Fi capability, and an ability to respond to a user input to generate and transmit an emergency signal including GPS coordinates at the instant the emergency signal is sent;
- a local monitoring station constructed to receive the emergency signal from the personal life safety device and relay the emergency signal to a central monitoring station; and
- when the central monitoring station receives said emergency signal from the local monitoring station, the central monitoring station constructed to receive and respond to said emergency signal from the local monitoring station by identifying the user GPS coordinates, and initiating a response by emergency responders, where in response to the received emergency signal, at least one of the central monitoring station and the local panel automatically initiates a direct, two-way VoIP communication channel with the personal life safety device providing direct communication between personnel at the central monitoring station or local panel and a user of the personal safety device thereby allowing the personnel to determine details relating to the emergency upon activation of the user input.

8. The central security and alarm system as set forth in claim 7, wherein the personal life safety device includes a panic button.

9. The central security and alarm system as set forth in claim 8, wherein the personal life safety device includes a microphone and speaker for VoIP communications.

10. The central security and monitoring station as set forth in claim 7, wherein the local monitoring station supports establishing and maintaining a VoIP communication channel between the central monitoring station and the personal life safety device.

* * * * *